Dec. 14, 1937.  A. P. CHARBONNEAU  2,102,304
PRESSURE RESPONSIVE DEVICE
Filed Sept. 12, 1935  2 Sheets-Sheet 1

Inventor
Allan P. Charbonneau
By Frank H. Hubbard,
Attorney

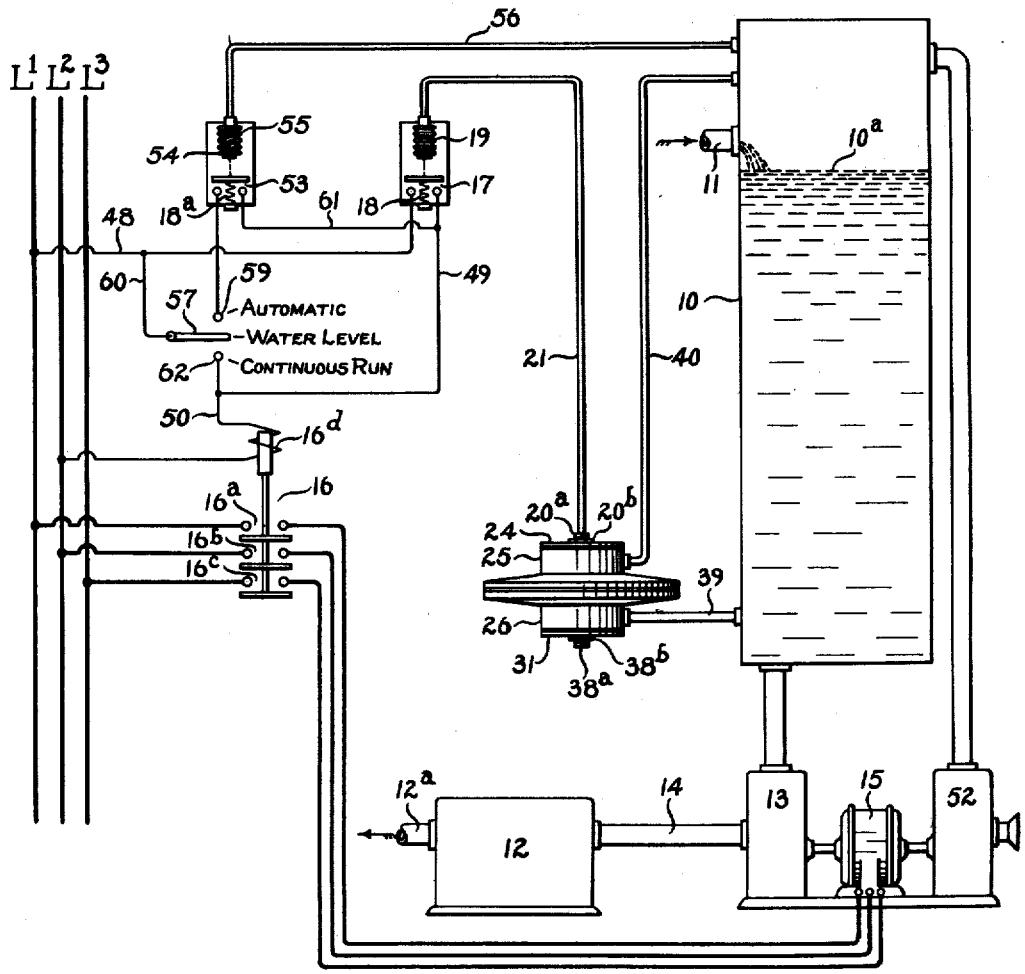

Patented Dec. 14, 1937

2,102,304

UNITED STATES PATENT OFFICE 2,102,304

PRESSURE RESPONSIVE DEVICE

Allan P. Charbonneau, Milwaukee, Wis., assignor to Cutler-Hammer, Inc., Milwaukee, Wis., a corporation of Delaware Application September 12, 1935, Serial No. 40,249

20 Claims. (Cl. 137—68)

This invention relates to improvements in pressure responsive devices. The invention relates more particularly to improvements in liquid level controlling devices for use with heating equipment.

A primary object of the invention is to provide a sensitive pressure regulator of improved form.

Another object is to provide a sensitive type pressure regulator having a novel means to compensate for varying fluid pressure conditions in the receiver.

Another and more specific object is to provide a simple, accurate and inexpensive system of liquid level control.

Another object is to provide a system of liquid level control which comprises essentially a flexible diaphragm upon one surface of which the column of liquid is adapted to act, the other surface of the diaphragm being subjected to pressure or vacuum conditions corresponding with those obtaining above the column of liquid.

Another object is to provide such a system wherein hydraulic means are employed for transmitting the diaphragm movements to suitable control instrumentalities,—means being provided for insuring like effective areas on the upper and lower surfaces of the diaphragm.

Another object is to provide a system of the aforementioned character wherein an electric motor is utilized for effecting transfer of the liquid from the receiver to a desired point of use thereof.

Another object is to provide novel manually adjustable control means for the motor whereby the maximum and minimum levels of liquid to be attained may be definitely preselected.

Another object is to provide a control system of the aforementioned character having associated motor control means for insuring a predetermined degree of vacuum within the liquid receiver.

Other objects and advantages of the invention will hereinafter appear.

The accompanying drawings illustrate certain embodiments of the invention which will now be described,—it being understood that the invention is susceptible of embodiment in other forms without departing from the scope of the appended claims.

Figure 1:
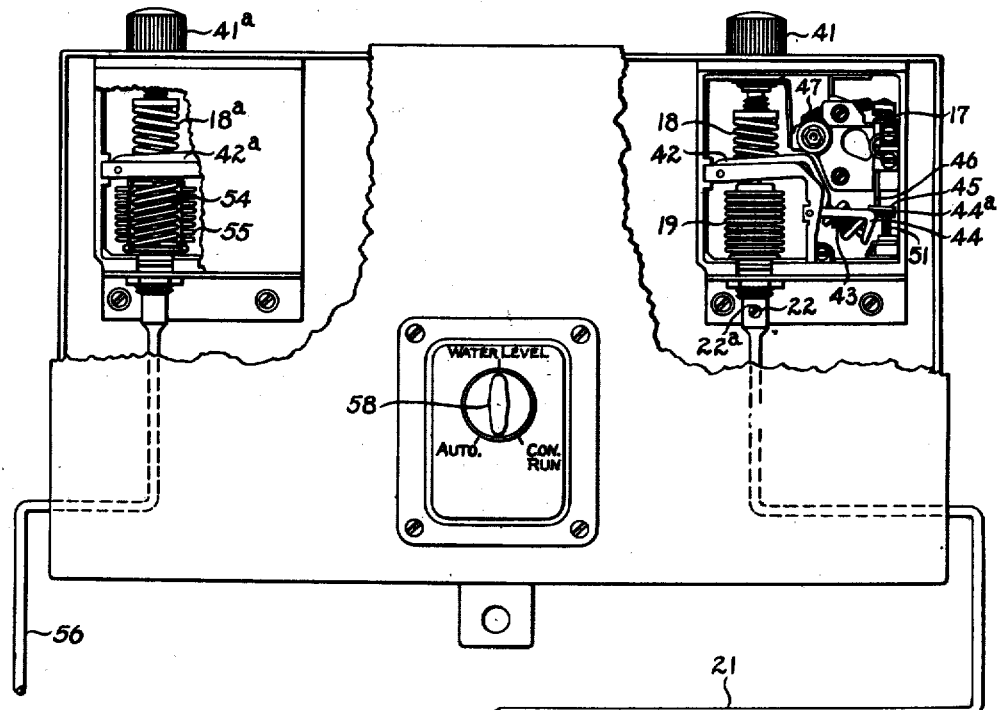

In the drawings, Figure 1 is a view of a panel having associated therewith the manually adjustable and automatically operable control instrumentalities which I prefer to employ,—and showing in section one form of sensitive pressure regulator which may be located at a point remote from the control panel.

Figure 2:
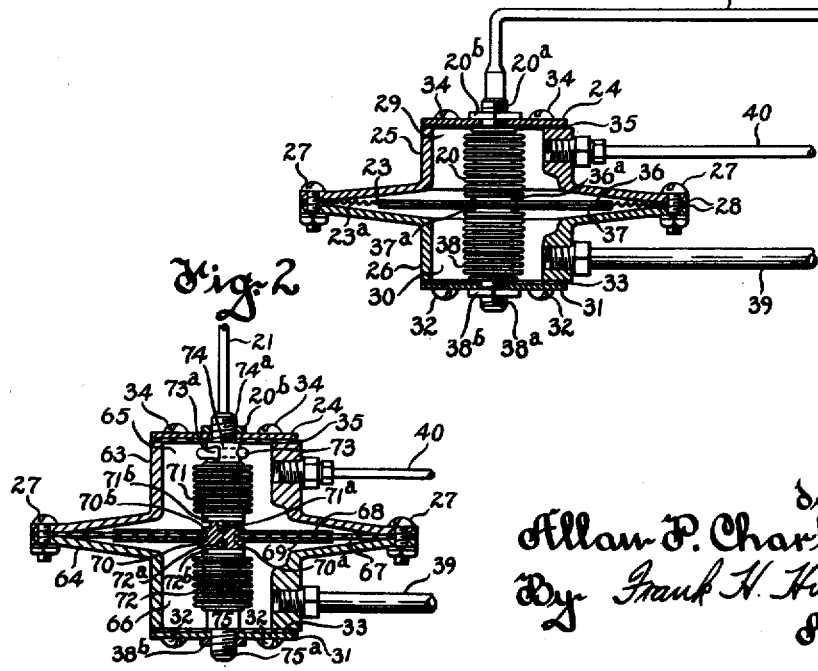

Fig. 2 is a vertical sectional view of a modified form of sensitive pressure regulator having certain advantages over the form of device illustrated in Fig. 1, and Fig. 3 is a schematic and diagrammatic illustration of a water level control system constructed in accordance with my invention.

As heretofore pointed out, my invention is particularly applicable to the control of the water level in the receptacle or tank which receives the water of condensation from a steam heating plant or the like. Thus in Fig. 3 I have shown a receptacle, container or tank 10 which is adapted to receive through conduit 11 the water which flows by gravity as a condensate from the condensing chamber (not shown) of the heating plant. Receptacle 10 is preferably closed against atmospheric pressure. The fluid pressure above the level of the body of water 10<sup>a</sup> in receptacle 10 may be either above or below atmospheric pressure,—depending upon the particular characteristics of the heating system with which my invention is employed. In the illustrated embodiment of my invention it is contemplated that a partial vacuum shall be maintained within receptacle 10, and the means hereinafter described are provided to insure against a decrease of the degree of vacuum beyond a predetermined value.

In a system of the character herein contemplated it is of primary importance to insure against rise or fall of the liquid in receptacle 10 beyond certain predetermined levels, while at the same time minimizing the number of starting and stopping operations of the electric motor which is utilized to effect transfer of the liquid from receptacle 10 to the boiler of the heating system. The boiler is shown diagrammatically at 12, and I have shown a pump 13 which when operated is adapted to withdraw water from the bottom portion of receptacle 10 and transfer the same through conduit 14 to said boiler 12. The steam generated in boiler 12 is circulated through piping, represented diagrammatically by the conduit 12<sup>a</sup>, and after circulation thereof the steam is condensed by any well known means (not shown), and the condensate flows as aforestated through conduit 11 to receptacle 10.

Pump 13 is adapted to be driven by a motor 15, and said motor is provided with control means now to be described which effects starting thereof upon attainment of a predetermined maximum level of the liquid in receptacle 10 and stopping thereof upon attainment of a predetermined minimum level of liquid in said receptacle. Motor 15 is adapted to be connected to a suitable source of energy supply, represented by lines L¹, L² and L³, upon closure of a normally open electromagnetically operable switch 16, the contacts of which are designated by the numerals 16ᵃ, 16ᵇ, and 16ᶜ and the operating winding of which is designated by the numeral 16ᵈ.

I will first describe the means for effecting energization and de-energization of the winding 16ᵈ upon attainment of the predetermined maximum and minimum levels of liquid in receptacle 10. Thus I have shown a switch 17 the contacts of which are normally biased to open position, as indicated diagrammatically in Fig. 3 by the compression spring 18. Arranged to act against and overcome the bias of compression spring 18 under certain conditions is an expansible and contractible bulb or bellows 19. Bellows 19 is formed in a well known manner from flexible metal, and the same is filled with a liquid which when under a predetermined degree of pressure is adapted to cause expansion of said bellows to an extent sufficient to effect closure of the contacts 17 of said switch.

As best illustrated in Fig. 1, the means for creating the aforementioned pressure of the liquid within bellows 19 comprises a second bellows 20 of like character and dimensions,—the bellows 19 and 20 communicating with each other through the medium of a conduit 21 of relatively small cross section. Conduit 21 and bellows 19 and 20 are completely filled, preferably at atmospheric pressure, with a single body of liquid, such as glycerine,—a filling opening 22 being provided for this purpose, and said opening being closed, as by means of a screw or bolt 22ᵃ. The bellows 19 and the bellows 20 are preferably located at points remote from each other,—the bellows 20 as shown being interposed between the upper surface of a flexible diaphragm 23 and the upper end wall 24 of a housing which supports and encloses said diaphragm. Said housing comprises an upper section 25 and a lower section 26 between the annular flanges of which said diaphragm is clamped by means of an annular series of nuts and bolts 27,—gaskets 28 being preferably interposed as shown to provide fluid-tight connections between said parts.

Said housing is thus provided with an upper chamber 29 and a lower chamber 30,—the latter being closed by the lower end wall 31 of the housing. Lower end wall 31 is removably attached to the housing as by means of an annular series of bolts 32,—a gasket 33 being employed to render the lower chamber fluid-tight. The upper end wall 24 is likewise removably attached to the housing as by means of a series of bolts 34,—a gasket 35 being employed to render the upper chamber fluid-tight. The diaphragm 23 is preferably formed of resilient metal, such as phosphor bronze, and the same is preferably provided with a plurality of annular corrugations 23ᵃ to provide the required degree of flexibility thereof. Rigidly secured to diaphragm 23 on opposite surfaces of the central portion thereof are a pair of metal disks 36 and 37,—said disks preferably being attached to said diaphragm as by means of a circular series of spot-welds (not shown).

I preferably interpose between the lower surface of the diaphragm 23 (or disk 37) and the lower end wall 31 of the housing a third bellows 38 like the bellows 19 and 20 aforementioned. The ends of the bellows 20 and 38 which seat against the respective disks 36 and 37 are preferably soldered, brazed or otherwise rigidly secured thereto, as indicated at 36ᵃ and 37ᵃ. The upper end of bellows 20 is provided with an externally threaded bushing 20ᵃ with which the nut 20ᵇ is adapted to cooperate to effect a rigid and fluid-tight connection between said end and the end wall 24 of the housing. In like manner the bellows 38 is provided at its lower end with an externally threaded bushing 38ᵃ for cooperative engagement by nut 38ᵇ to effect a rigid and fluid-tight connection between said end and the lower end wall 31 of the housing. Said bushing 38ᵃ is provided with a passage therethrough to afford communication between the interior of bellows 38 and atmosphere. The primary purpose of the bellows 38 in the arrangement illustrated is to equalize the effective area of the lower surface of diaphragm 23 with respect to the effective area at the upper surface of the latter.

As shown, a conduit 39 affords communication between the lower chamber 30 (Fig. 1) of the housing and the receptacle 10 (Fig. 3) below the contemplated minimum level of liquid in the latter. In like manner I prefer to provide a conduit 40 which affords communication between the upper chamber 29 of the housing and the receptacle 10 (Fig. 1) above the contemplated maximum level of liquid in the latter. With the arrangement illustrated it will be apparent that both the upper and lower surfaces of diaphragm 23 will be subjected to the pressure or vacuum conditions obtaining above the level of liquid in container 10,—wherefore the effect of such conditions, or variations thereof, upon said diaphragm will be compensated for or neutralized. As aforestated in the particular embodiment of my invention herein illustrated it is contemplated that a partial vacuum shall be maintained above the level of liquid in receptacle 10,—the degree of vacuum being, of course, variable due to variations in the height of liquid in said receptacle, and due to other causes. It will of course be apparent to those skilled in the art that if the receptacle 10 were left open to atmosphere the upper chamber 29 of the housing might also be left open to atmosphere,—thus obviating the necessity for use of the conduit 40.

By arrangement of the parts as shown it will be apparent that the lower surface of diaphragm 23 is subjected to a pressure effect which is definitely and accurately proportional to the height above conduit 39 of the level of liquid within receptacle 10. Consequently upon a rise in said level to a predetermined height the diaphragm 23 will have been moved upwardly to a proportional degree. Such upward movement of diaphragm 23 effects compression or collapse of the bellows 20 with a corresponding degree of expansion or enlargement of the length of bellows 19. The bellows 19 in expanding acts against the compression spring 18 (Fig. 1),—the initial degree of compression of which spring is manually adjustable, as by means of the knob 41. When the bias of spring 18 is overcome by expansion of bellows 19 the pivoted lever 42 is moved to the upper extreme position thereof illustrated,—the free end of said lever during such movement being adapted to throw the compression spring 43 across the dead center, with consequent movement of the pivoted lever 44 with a snap action to the lower extreme position thereof illustrated. Lever 44 is provided with an extension 44ᵃ to which an insulating plate 45 is attached,—which insulating plate upon movement thereof to the downward extreme position illustrated is adapted to permit downward movement of the insulating plate 46 by gravity and under the bias of a coiled tension spring 47 whereby the switch contacts 17 are closed.

The contacts 17 when thus closed are adapted to complete an energizing circuit for the operating winding 16d of switch 16 (Fig. 3), which circuit may be traced from line L¹ by conductor 48 through said contacts 17, and by conductors 49 and 50 through said winding 16d to line L². The contacts 16ª, 16b and 16c of switch 16 are thereupon closed to complete an energizing circuit for motor 15,—said circuit being obvious. Motor 15 upon energization thereof drives pump 13 to effect transfer of liquid from receptacle 10 to the boiler 12. When the liquid within receptacle 10 reaches a predetermined minimum level the reduction in pressure upon diaphragm 23 will have permitted downward movement thereof toward its normal or intermediate position,—with consequent expansion of bellows 20 and contraction of bellows 19 to the normal lengths thereof, whereby the compression spring 18 is permitted to act to effect downward movement of lever 42 and upward movement of lever 44 with a snap action. Lever 44 thus acts through its associated insulating plates 45 and 46 to effect opening of contacts 17 with a snap action, with consequent de-energization and opening of switch 16 and stopping of motor 15.

As aforeindicated the initial degree of compression of spring 18 is manually adjustable wherefore the maximum height of the level of liquid to be attained within receptacle 10 may be preselected at will. In like manner I prefer to provide an adjustable screw or bolt 51 which acts as an abutment to limit the downward throw of lever 44 beyond the dead center of its movement. By this means I am enabled to definitely adjust and/or vary the minimum level of liquid to be attained within receptacle 10 prior to opening movement of switch contacts 17 to effect stopping of motor 15. The manner of effecting adjustment of spring 18 and of abutment 51 is described in detail in the co-pending application of C. W. Kuhn, Serial No. 708,804, filed January 29, 1934,—said features per se forming no part of the present invention.

In certain installations it is desired to insure against a decrease in pressure below or a decrease in the degree of vacuum beyond certain preselected values thereof to be maintained in receptacle 10 above the level of liquid in the latter. In the illustrated embodiment of my invention it is desired to insure at least a predetermined degree of vacuum in said container, and a vacuum pump 52 is employed to produce the desired degree of vacuum. Pump 52 may be driven by a motor separate from the motor 15 and be subject to control independently of the latter. For purposes of economy and simplicity, however, I have shown the motor 15 as a common means for jointly driving both pumps 13 and 52, and I provide a switch 53 which is normally biased to closed position to provide an alternative means for completing and interrupting the energizing circuit of the operating winding 16d of switch 16.

In Fig. 3 I have diagrammatically shown the switch 53 biased toward closed position by means of a coiled compression swing 54 which is enclosed within a bellows 55, said spring 54 acting or tending to effect expansion of bellows 55 beyond the normal length thereof. A coiled compression spring 18ª, like the spring 18 described in connection with switch 17, is provided,—the degree of compression of spring 18ª being adjustable manually as by means of knob 41ª to neutralize to the desired extent the biasing action of spring 54. The other parts of the switch and switch actuating mechanism shown at the left-hand side of Fig. 1 may be identical with the aforedescribed parts of switch 17 and its actuating mechanism.

The interior of bellows 55 is connected by a conduit 56 with the receptacle 10 above the maximum level of liquid in the latter, so that when the degree of vacuum within receptacle 10 is equal to or greater than a preselected value the bellows 55 will be contracted against the action of spring 54 to an extent sufficient to permit opening of switch 53 (Fig. 3) under the action of the adjustable compression spring 18ª. On the other hand, when the degree of vacuum within receptacle 10 falls below the value preselected therefor, the spring 54 will effect expansion of bellows 55 against the action of spring 18ª to automatically effect closing of said contacts 53.

In order to render the contacts 53 effective when closed for completing an energizing circuit for the winding 16d I prefer to provide a manually operable selector switch the contactor of which is shown diagrammatically at 57 in Fig. 3, and the operating knob or handle of which is shown at 58 in Fig. 1. Thus when contactor 57 is moved into engagement with contact 59 (Fig. 3) contacts 53 when closed will complete a circuit which may be traced from line L¹ by conductors 48 and 60 through contactor 57 and contact 59, thence through said contacts 53 and by conductors 61, 49 and 50 through said winding 16d to line L². The contacts of switch 16 are closed in the manner aforedescribed to complete the circuit of motor 15 which drives the suction pump 52 to increase the degree of vacuum in receptacle 10 above the level of liquid in the latter. When the desired degree of vacuum is attained the bellows 55 will again be contracted to a degree sufficient to effect opening of the contacts 53 as aforedescribed.

Due to the fact that a single driving motor 15 is employed it will be apparent that when the indicating knob 58 (Fig. 1) is set at the point marked "Auto." (in which position contactor 57 of Fig. 3 engages contact 59) the motor 15 will be operated in the event of a drop in the degree of vacuum beyond the preselected value, or in the event of attainment of a predetermined maximum level of liquid within receptacle 10. In either event the motor 15 will be operated to simultaneously increase the degree of vacuum in said receptacle and to effect transfer of liquid from the latter to boiler 12.

With knob 58 in the position thereof shown in Fig. 1 (which corresponds with intermediate positioning of contactor 57 as shown in Fig. 3) variations in the degree of vacuum in receptacle 10 will have no controlling effect upon motor 15, but upon operation of said motor in response to closure of the contacts 17 of the liquid level controlling switch, the vacuum pump 52 will likewise be driven to effect an increase in the degree of vacuum.

Also as shown in Fig. 3 the contactor 57 when engaged with contact 62 is adapted to provide for continuous energization of the winding 16d whereby motor 15 may be operated continuously independently of the automatic control means aforedescribed. This position of contactor 57 is provided by counterclockwise movement of knob 50 (Fig. 1) to the point marked "Con. run". As aforeindicated, the vacuum pump 52 might be provided with a separate driving motor to be controlled by the switch contacts 53 and an associated line switch similar to that shown at 16. Similarly in some installations the vacuum pump 52 might be entirely omitted; as, for instance, where the receptacle 10 is open to atmosphere; or a fluid pressure producing pump might be substituted for the pump 52, in which event the operating means for the switch contacts 53 would be modified to provide for biasing thereof to closed position, the same to be opened automatically upon attainment of a predetermined degree of fluid pressure in receptacle 10 above the level of liquid therein.

The parts shown in the fragmentary sectional view of Fig. 2 are in general quite similar to the corresponding parts shown in Fig. 1. In Fig. 2, however, the housing sections 63 and 64 are of slightly greater axial dimensions than in the device of Fig. 1, whereby upper and lower chambers 65 and 66 of slightly greater size are provided. Moreover, the diaphragm 67 in Fig. 2 is preferably formed of or comprises rubber or similar elastic material in the shape of a circular disk or sheet the outer annular portion of which is clamped between the housing sections 63 and 64 as by means of bolts 27. Arranged on opposite faces of diaphragm 67 are the pair of metal disks or circular plates 68 and 69. Diaphragm 67 and disks 68 and 69 are provided with registering central openings to closely accommodate the reduced portion 70ª of a machined metal member 70—said reduced portion having an enlargement or flange 70ᵇ formed thereon by an upsetting or swaging operation, to rigidly secure the parts 67, 68, 69, and 70 in assembled relation. Member 70 is provided at each end thereof with a tapped recess as shown, said recesses being respectively adapted to receive the threaded studs 71ª, 72ª formed integrally with the disks 71ᵇ, 72ᵇ which are brazed, soldered, welded or otherwise rigidly attached to the adjacent ends of the respective bellows 71 and 72.

By the arrangement illustrated in Fig. 2 it will be seen that the housing sections 63 and 64 may be assembled with diaphragm 67 at the factory and shipped separately from the bellows 71 and 72, which may be attached to the diaphragm by the user, it being only necessary in assembling the bellows to the diaphragm to see that the threaded extensions are inserted to their full depth into the recesses in member 70. In the device shown in Fig. 1, on the other hand, it is necessary or at least extremely desirable to assemble the housing parts, the diaphragm and the three bulbs or bellows as a unit at the factory—wherefore greater care in packing, handling and shipping the device is required than is required with an arrangement like that shown in Fig. 2.

Also in the arrangement shown in Fig. 2 I provide improved means for effecting filling and sealing of the bellows 71, conduit 21, and the bellows (like 71) which is attached to the other end of said conduit. Said means as shown preferably comprises a suitable length 73 of metal tubing, one end of which is secured within a radial opening or passage formed in the tubular member 74 which is rigidly attached to the upper end of bellows 71, the free end 73ª of said tubing being initially open, and the same being compressed or flattened and soldered after filling of the two bellows and the conduit 21 with a suitable liquid, such as glycerine. Tubing 73 may be coiled around member 74 in the manner illustrated to provide for insertion of bellows 71 within the upper chamber of the housing.

Member 74 is provided with an externally threaded end 74ª which cooperates with nut 20ᵇ for clamping of said member to the upper cover member 24, which is attached to housing section 63 as by means of bolts 34—gasket 35 providing a fluid-tight connection, as aforedescribed. Bellows 72 is likewise provided with a tubular member 75 having an externally threaded end 75ª, which cooperates with nut 38ᵇ to afford securement of member 75 to the bottom cover member 31, which is attached to the lower housing member 64 by means of bolts 32—a fluid-tight connection being provided by the interposed gasket 33. It will be understood that the several parts shown in Fig. 2 may be substituted for the corresponding parts shown in the device of Fig. 1.

In practice it is preferred during assembly of the apparatus to insure complete filling of the lower chamber (30 or 66) of the housing and the conduit 39 with water or other liquid like that in receptacle 10, to prevent entrapment of air below the diaphragm (23 or 67).

It is to be understood that in the particular installation illustrated in Fig. 3 it is not contemplated that the air, under a partial vacuum or under a given degree of pressure, within conduit 40 shall produce a condensate such as would gradually fill conduit 40 to the upper end of the latter. On the other hand, in an installation wherein the fluid above the level of liquid 10ª in container 10 is likely to condense within conduit 40 and thus gradually fill the latter, this exigency may be taken care of in various ways. Thus the end of conduit 40 which opens to container 10 may have attached thereto, for communication therewith, an expansible and contractible member responsive to pressure or vacuum condition within container 10. Alternatively, the conduit 40 may be initially manually filled to the level of the upper end thereof with water or other suitable liquid—any drop in the level of liquid within conduit 40 being compensated for by subsequent condensation of the air or other vapor located therein; or such filling of conduit 40 with liquid may be permitted to progress gradually, as an incident to condensation of the air or other gaseous fluid located therewithin. The simplest and most satisfactory solution of such a problem resides in connecting the upper end of conduit 40 to the lowermost wall of the conduit 11, whereby conduit 40 will be initially rapidly filled by and continuously replenished with the condensate flowing through conduit 11 to container 10.

In an installation wherein it is necessary to have the chamber 29 (Fig. 1) and conduit 40 filled with condensate or other liquid, it is of course necessary to re-calibrate the device to compensate for the additional pressure upon the upper surface of diaphragm 23 and disk 36—and such re-calibration may be effected in a simple manner by adjustment of knob 41 to correspondingly increase the degree of compression of spring 18 (Fig. 1).

What I claim as new and desire to secure by Letters Patent is:

1. In a device of the character described, in combination, a container adapted to receive a supply of liquid, a housing, a diaphragm located within said housing, means for subjecting the upper surface of the body of liquid within said container and the upper and lower surfaces of said diaphragm to the pressure conditions obtaining above said body of liquid, said means being adapted to additionally subject the lower surface of said diaphragm to a degree of fluid pressure proportional to the height above a given level of the level of liquid within said container, a switch located at a point remote from said housing, operating means for said switch, and means for rendering said operating means subject to control by said diaphragm, said last mentioned means including fluid means for transmitting movements of said diaphragm to said switch operating means.

2. In a device of the character described, in combination, a container adapted to receive a supply of liquid, a housing, a diaphragm located within said housing, means for insuring like degrees of gaseous fluid pressure upon the upper surface of the body of liquid within said container and upon the upper and lower surfaces of said diaphragm, said means being adapted to additionally subject the lower surface of said diaphragm to a degree of hydrostatic pressure proportional to the height, above a given height, of the body of liquid within said container, an electric switch located at a point remote from said housing and biased to a given operative position, operating means for said switch, and hydraulic pressure transmitting means interposed between said switch operating means and said diaphragm for subjecting the former to control by the latter.

3. In a device of the character described, in combination, a container adapted to receive a supply of liquid, a housing, a diaphragm located within said housing, means for insuring like degrees of gaseous fluid pressure upon the upper surface of the body of liquid within said container and upon the upper and lower surfaces of said diaphragm, said means being adapted to additionally subject the lower surface of said diaphragm to a degree of pressure proportional to the height, above a given height, of the body of liquid within said container, an electric switch located at a point remote from said housing, operating means for said switch, hydraulic pressure transmitting means interposed between said switch operating means and said diaphragm for subjecting the former to control by the latter, a pump adapted when operated to effect transfer of liquid from said container to a desired point of use thereof, an electric motor for driving said pump, and means for subjecting said electric motor to control by said switch.

4. In a device of the character described, in combination, a container adapted to receive a supply of liquid, a housing, a diaphragm located within said housing, means for insuring like degrees of gaseous fluid pressure upon the upper surface of the body of liquid within said container and upon the upper and lower surfaces of said diaphragm, said means being adapted to additionally subject the lower surface of said diaphragm to a degree of pressure proportional to the height, above a given height of the body of liquid within said container, an electric switch located at a point remote from said housing, operating means for said switch, hydraulic pressure transmitting means interposed between said switch operating means and said diaphragm for subjecting the former to control by the latter, a pump adapted when operated to effect transfer of liquid from said container to a desired point of use thereof, an electric motor for driving said pump, means for subjecting said electric motor to control by said switch, the means aforedescribed being adapted to effect closure of said switch upon a predetermined degree of rise in the level of liquid within said container and to effect opening of said switch upon a predetermined degree of lowering of said liquid level.

5. In a device of the character described, in combination, a housing, a flexible diaphragm located within and supported by said housing, a pair of bellows, one of said bellows being interposed between the upper surface of said diaphragm and the upper end wall of said housing, the other bellows being interposed between the lower surface of said diaphragm and the lower end wall of said housing, said last mentioned bellows having a passage to provide for communication between the interior thereof and atmosphere, a third bellows located at a point remote from said housing, a tube connecting said third bellows and said first mentioned bellows, a body of liquid adapted to fill said tube and the two bellows associated therewith, a container adapted to receive a body of liquid, means affording communication between said container above the body of liquid therein and the upper surface of said diaphragm, and means affording communication between the lower portion of said container and the lower surface of said diaphragm, whereby the lower surface of said diaphragm is subjected to a liquid pressure which is definitely proportional to the height, above a given height, of the liquid within said container, a switch biased to open position, said third bellows being associated with said switch in a manner to effect closure thereof against said bias upon a predetermined degree of upward movement of said diaphragm, a pump associated with said container and adapted when operated to effect transfer of liquid from the latter, an electric motor for driving said pump, and means for rendering said motor subject to control by said switch.

6. In a liquid level controlling device, in combination, a receptacle closed to atmospheric pressure, means for supplying liquid to said receptacle, means for effecting discharge of liquid from said receptacle, said last mentioned means comprising a pump having the inlet end thereof connected with said receptacle at the lower end of the latter, an electric motor for driving said pump, control means for said motor comprising a normally open switch, means for effecting closure of said switch to thereby effect completion of a circuit for said motor upon attainment of a predetermined level of liquid within said receptacle, said last mentioned means comprising a flexible diaphragm located exteriorly of said receptacle at a point adjacent to the lower end thereof, a housing within which said diaphragm is supported and enclosed to provide an upper chamber and a lower chamber, means comprising a conduit affording communication between the lower chamber and said receptacle at a point adjacent to the lower end of the latter, a bellows located within said upper chamber and having its ends respectively interposed between the upper surface of said diaphragm and the upper end wall of said housing, a like bellows having its ends respectively interposed between a fixed support and an operating element of said switch, a conduit connecting said bellows, a common body of liquid within said two bellows and said conduit, and means comprising a conduit affording communication between the upper chamber and said receptacle above the level of liquid in the latter.

7. In combination, a receptacle closed to atmospheric pressure adapted to contain a body of liquid, a normally open electric switch, means for effecting closure of said switch, said means comprising a flexible diaphragm located exteriorly of said receptacle at a point adjacent to the lower end thereof, a housing within which said diaphragm is supported and enclosed to provide an upper chamber and a lower chamber, means comprising a conduit affording communication between the upper chamber and said receptacle above the level of liquid in the latter, means comprising a conduit affording communication between the lower chamber and said receptacle at a point adjacent to the lower end of the latter, a bellows located within said upper chamber and having its ends respectively interposed between the upper surface of said diaphragm and the upper end wall of said housing, a second bellows having its ends respectively interposed between a fixed support and an operating element of said switch, a conduit connecting said two bellows, a common body of fluid within said two bellows and said last mentioned conduit, and adjustable spring means associated with said switch to preset the latter for closing operation thereof through upward movement of said diaphragm upon attainment of a predetermined maximum level of liquid within said receptacle.

8. In combination, a receptacle closed to atmospheric pressure, adapted to contain a body of liquid, a normally open electric switch, means for effecting closure of said switch, said means comprising a flexible diaphragm located exteriorly of said receptacle at a point adjacent to the lower end thereof, a housing within which said diaphragm is supported and enclosed to provide an upper chamber and a lower chamber, means comprising a conduit affording communication between the upper chamber and said receptacle above the level of liquid in the latter, means comprising a conduit affording communication between the lower chamber and said receptacle at a point adjacent to the lower end of the latter, a bellows located within said upper chamber and having its ends respectively interposed between the upper surface of said diaphragm and the upper end wall of said housing, a second bellows having its ends respectively interposed between a fixed support and an operating element of said switch, a conduit connecting said two bellows, a common body of fluid within said two bellows and said last mentioned conduit, adjustable spring means associated with said switch to preset the latter for closing operation thereof through upward movement of said diaphragm upon attainment of a predetermined maximum level of liquid within said receptacle, and additional means associated with said switch, said last mentioned means being adjustable to preset said switch for opening operation thereof through downward movement of said diaphragm upon attainment of a predetermined minimum level of liquid within said receptacle.

9. In combination, a receptacle closed to atmospheric pressure, adapted to contain a body of liquid, a normally open electric switch, means for effecting closure of said switch, said means comprising a flexible diaphragm located exteriorly of said receptacle at a point adjacent to the lower end thereof, a housing within which said diaphragm is supported and enclosed to provide an upper chamber and a lower chamber, means comprising a conduit affording communication between the upper chamber and said receptacle above the level of liquid in the latter, means comprising a conduit affording communication between the lower chamber and said receptacle at a point adjacent to the lower end of the latter, a bellows located within said upper chamber and having its ends respectively interposed between the upper surface of said diaphragm and the upper end wall of said housing, a second bellows having its ends respectively interposed between a fixed support and an operating element of said switch, a conduit connecting said two bellows, a common body of fluid within said two bellows and said last mentioned conduit, adjustable spring means associated with said switch to preset the latter for closing operation thereof through upward movement of said diaphragm upon attainment of a predetermined maximum level of liquid within said receptacle, additional means associated with said switch, said last mentioned means being adjustable to preset said switch for opening operation thereof through downward movement of said diaphragm upon attainment of a predetermined minimum level of liquid within said receptacle, and means comprising a third bellows interposed between the lower surface of said diaphragm and the lower end wall of said housing, whereby the effective areas of the upper and lower surfaces of said diaphragm are equalized, said last mentioned bellows having a passage affording communication between the interior thereof and atmosphere.

10. In a device of the character described, in combination, a housing, a flexible diaphragm located within and supported by said housing, a pair of bellows, one of said bellows being interposed between the upper surface of said diaphragm and the upper end wall of said housing, the other bellows being interposed between the lower surface of said diaphragm and the lower end wall of said housing, said last mentioned bellows having a passage to provide for communication between the interior thereof and atmosphere, a third bellows located at a point remote from said housing, a tube connecting said third bellows and said first mentioned bellows, a body of liquid adapted to fill said tube and the two bellows associated therewith, a container adapted to receive a body of liquid, means affording communication between said container above the body of liquid therein and the upper surface of said diaphragm, and means affording communication between the lower portion of said container and the lower surface of said diaphragm, whereby the lower surface of said diaphragm is subjected to a pressure greater than the pressure above said body of liquid to an amount which is definitely proportional to the height, above a given level, of liquid within said container, a switch biased to open position, said third bellows being associated with said switch in a manner to effect closure thereof against said bias upon a predetermined degree of upward movement of said diaphragm, and said switch after closure thereof being adapted to open under said bias upon a predetermined degree of downward movement of said diaphragm.

11. In a device of the character described, in combination, a housing, a flexible diaphragm located within and supported by said housing, a pair of bellows, one of said bellows being interposed between the upper surface of said diaphragm and the upper end wall of said housing, the other bellows being interposed between the lower surface of said diaphragm and the lower end wall of said housing, said last mentioned bellows having a passage to provide for communication between the interior thereof and atmosphere, a third bellows located at a point remote from said housing, a tube connecting said third bellows and said first mentioned bellows, a body of liquid adapted to fill said tube and the two bellows associated therewith, a container adapted to receive a body of liquid, means affording communication between said container above the body of liquid therein and the upper surface of said diaphragm, means affording communication between the lower portion of said container and the lower surface of said diaphragm, whereby the lower surface of said diaphragm is subjected to a pressure greater than the pressure above said body of liquid to an amount which is definitely proportional to the height, above a given level, of liquid within said container, a switch biased to open position, said third bellows being associated with said switch in a manner to effect closure thereof against said bias upon a predetermined degree of upward movement of said diaphragm, said switch after closure thereof being adapted to open under said bias upon a predetermined degree of downward movement of said diaphragm, and means associated with said switch for independently controlling response thereof to upward and downward movements of said diaphragm.

12. In a device of the character described, in combination, a housing, a flexible diaphragm located within and supported by said housing, a pair of bellows, one of said bellows being interposed between the upper surface of said diaphragm and the upper end wall of said housing, the other bellows being interposed between the lower surface of said diaphragm and the lower end wall of said housing, said last mentioned bellows having a passage to provide for communication between the interior thereof and atmosphere, a third bellows located at a point remote from said housing, a tube connecting said third bellows and said first mentioned bellows, a quantity of liquid adapted to fill said tube and the two bellows associated therewith, a container adapted to receive a body of liquid, means affording communication between said container above the body of liquid therein and the upper surface of said diaphragm, means affording communication between the lower portion of said container and the lower surface of said diaphragm whereby the lower surface of said diaphragm is subjected to a pressure greater than the pressure above said body of liquid to an amount which is definitely proportional to the height, above a given level, of liquid within said container, a switch biased to open position, said third bellows being associated with said switch in a manner to effect closure thereof against said bias upon a predetermined degree of upward movement of said diaphragm, said switch after closure thereof being adapted to open under said bias upon a predetermined degree of downward movement of said diaphragm, adjustable spring means associated with said first mentioned bellows and said switch and cooperating with said diaphragm to provide for preselection of the upper level of liquid within said container at which said switch is adapted to close, and additional adjusting means associated with said switch and cooperating with said diaphragm to provide for preselection of the lower level of liquid within said container at which said switch is adapted to open, for the purpose set forth.

13. In a liquid level controlling device of the type comprising a container adapted to receive liquid, a pump for effecting transfer of said liquid from the container to a point of use thereof, and an electric motor for driving said pump, in combination, means for effecting completion of a circuit for said motor upon attainment of a predetermined maximum level of liquid within said container and for effecting interruption of said circuit upon attainment of a predetermined minimum level of liquid within said container, said means comprising an electric switch normally biased to open position and fluid pressure responsive means for controlling the operation thereof, said fluid pressure responsive means comprising a pair of bellows located at spaced points and in communication with each other, a quantity of liquid filling said bellows and the line of communication therebetween, one of said bellows being associated with said switch and adapted to control the operation thereof, a diaphragm against the upper surface of which the lower end of the other bellows is adapted to seat, a housing within which said last mentioned bellows and said diaphragm are enclosed and supported, means affording communication between the lower portion of said housing and the lower portion of said container, and means for subjecting the upper surface of said diaphragm to the pressure obtaining above the body of liquid within said container.

14. In a liquid level controlling device of the type comprising a container adapted to receive liquid, a pump for effecting transfer of said liquid from the container to a point of use thereof, and an electric motor for driving said pump, in combination, means for effecting completion of a circuit for said motor upon attainment of a predetermined maximum level of liquid within said container and for effecting interruption of said circuit upon attainment of a predetermined minimum level of liquid within said container, said means comprising an electric switch normally biased to open position and fluid pressure responsive means for controlling the operation thereof, said fluid pressure responsive means comprising a pair of metal bellows located at spaced points and in communication with each other, a quantity of liquid filling said bellows and the line of communication therebetween, one of said bellows being associated with said switch and adapted to control the operation thereof, a diaphragm to the upper surface of which the lower end of the other bellows is rigidly attached, a housing within which said diaphragm is enclosed and supported, the upper end of said last mentioned bellows being rigidly attached to the upper end wall of said housing, means comprising a conduit affording communication between that portion of the housing above said diaphragm and that portion of the container above the level of liquid in the latter, means comprising a conduit affording communication between that portion of the housing below said diaphragm and a portion of the container below the minimum level of liquid within the latter whereby the lower surface of said diaphragm is subjected to a degree of hydrostatic pressure greater than the pressure above the liquid in said container to an amount proportional to the level, above a given level, of liquid within said container, and a third bellows having its upper and lower ends rigidly attached respectively to the lower surface of said diaphragm and to the lower end wall of said housing, said two bellows within the housing being of equal dimensions and arranged in endwise alinement with each other whereby the effective areas of the upper and lower surfaces of said diaphragm are equal to each other, and said third bellows having a passage affording direct communication between the interior thereof and atmosphere.

15. In a device of the character described, in combination, a container adapted to receive liquid, a pump communicating with the lower end of said container for effecting transfer of liquid therefrom to a desired point of use, a second pump communicating with said container above a preselected maximum level of liquid therein and adapted when operated to create a partial vacuum above said liquid, an electric motor affording a common drive for said pumps, alternative control means for said motor comprising a pair of switches, one of said switches being normally biased to closed position and the other of said switches being normally biased to open position, the operating means for said normally closed switch comprising an expansible bellows which is normally expanded to such a degree as to effect closure of said switch, said bellows having a conduit affording communication between the interior thereof and the interior of said container above the level of liquid in the latter whereby upon attainment of a predetermined degree of vacuum in said container said bellows is so contracted as to effect opening of said normally closed switch, said normally closed switch when closed being adapted to insure completion of a circuit for said motor and said switch when opened tending to effect interruption of said circuit, but subject to simultaneous open positioning of said normally open switch, the operating means for said normally open switch comprising a pair of bellows one of which is located adjacent to said switch and the other of which is located adjacent to said container, the bellows of said pair being in communication with each other and the same containing a common quantity of liquid, a flexible diaphragm and a housing supporting and enclosing said diaphragm to provide upper and lower chambers, the second bellows of said pair being located within the upper chamber of said housing and the same being rigidly attached to the upper surface of said diaphragm and to the upper end wall of said housing, a conduit affording communication between said upper chamber and said container above the level of liquid in the latter, a conduit affording communication between said lower chamber and said container below a preselected minimum level of liquid in the latter, a bellows located within said lower chamber, the opposite ends of said bellows being rigidly attached respectively to the lower surface of said diaphragm and to the lower end wall of said housing, and said bellows having a passage affording communication between the interior thereof and atmosphere, said two bellows within said housing being arranged in endwise alinement and the same being of substantially equal dimensions, for the purpose set forth.

16. In a sensitive pressure regulating device, in combination, a housing divided in a plane at right angles to the longitudinal axis thereof, a flexible diaphragm interposed between and supported by the housing sections to provide an upper chamber and a lower chamber, a bellows interposed between the upper surface of said diaphragm and the upper end wall of said housing, a like bellows interposed between the lower surface of said diaphragm and the lower end wall of said housing, said last mentioned bellows having a passage affording communication between the interior thereof and atmosphere, a third bellows located at a remote point, a conduit leading from said first mentioned bellows and affording communication between the same and said third bellows, the conduit end of said third bellows being rigidly attached to a fixed support and the free end thereof being adapted for cooperation with a control element, a quantity of liquid common to and entrapped within said first and third bellows and the conduit associated therewith, means comprising a conduit affording communication between the lower chamber and the lower end portion of a receptacle adapted to contain a body of liquid, the arrangement being such that said control element is normally biased for operation thereof in a given direction, and said control element being operable in the reverse direction by said third bellows against said bias upon attainment of a predetermined maximum level of the liquid within said receptacle.

17. In a sensitive pressure regulating device, in combination, a housing divided in a plane at right angles to the longitudinal axis thereof, a flexible diaphragm interposed between and supported by the housing sections to provide an upper chamber and a lower chamber, a bellows interposed between the upper surface of said diaphragm and the upper end wall of said housing, a like bellows interposed between the lower surface of said diaphragm and the lower end wall of said housing, said last mentioned bellows having a passage affording communication between the interior thereof and atmosphere, a conduit leading from said first mentioned bellows and affording communication between the same and a third bellows located at a remote point, the conduit end of said third bellows being rigidly attached to a fixed support and the free end thereof being adapted for cooperation with a control element, a quantity of liquid common to and entrapped within said first and third bellows and the conduit associated therewith, means comprising a conduit affording communication between the lower chamber and the lower end portion of a receptacle adapted to contain a body of liquid, means comprising a conduit affording communication between the upper chamber and said receptacle above the level of liquid in the latter, whereby the pressure conditions above said liquid are equally effective on opposite sides of said diaphragm, the arrangement being such that said control element is normally biased for operation thereof in a given direction, and said control element being operable in the reverse direction by said third bellows against said bias upon attainment of a predetermined maximum level of the liquid within said receptacle.

18. In a sensitive pressure regulating device, in combination, a housing divided in a plane at right angles to the longitudinal axis thereof, a flexible diaphragm interposed between and supported by the housing sections to provide an upper chamber and a lower chamber, a bellows interposed between the upper surface of said diaphragm and the upper end wall of said housing, a like bellows interposed between the lower surface of said diaphragm and the lower end wall of said housing, said last mentioned bellows having a passage affording communication between the interior thereof and atmosphere, a conduit leading from said first mentioned bellows and affording communication between the same and a third bellows located at a remote point, the conduit end of said third bellows being rigidly attached to a fixed support and the free end thereof being adapted for cooperation with a control element, a quantity of liquid common to and entrapped within said first and third bellows and the conduit associated therewith, a receptacle adapted to contain a body of liquid, means comprising a conduit affording communication between the lower chamber and the lower end portion of said receptacle, means comprising a conduit affording communication between the upper chamber and said receptacle above the level of liquid in the latter, whereby the pressure conditions above said liquid are equally effective on opposite sides of said diaphragm, the arrangement being such that said control element is normally biased for operation thereof in a given direction, said control element being operable in the reverse direction by said third bellows against said bias upon attainment of a predetermined maximum level of the liquid within said receptacle, and said control element being operable automatically in the direction of said bias upon attainment of a predetermined minimum level of liquid within said receptacle.

19. In a device of the character described, in combination, a housing, a diaphragm located within said housing, means for insuring like degrees of gaseous fluid pressure upon the upper and lower surfaces of said diaphragm, said means being adapted to additionally subject the lower surface of said diaphragm to a degree of fluid pressure proportional to the height, above a given height of a given body of liquid, an electric switch having relatively movable contacts located at a point remote from said housing, operating means for said switch contacts, said operating means including means for biasing said contacts to given positions relatively to each other, and hydraulic pressure transmitting means interposed between said switch operating means and said diaphragm for subjecting the former to control by the latter.

20. In a device of the character described, in combination, a housing divided in a plane at right angles to the longitudinal axis thereof, a flexible diaphragm interposed between and supported by the housing sections to provide an upper chamber and a lower chamber, a bellows interposed between and having its respective ends attached to the upper surface of said diaphragm and the upper end wall of said housing, a bellows of like dimensions interposed between and having its respective ends attached to the lower surface of said diaphragm and the lower end wall of said housing, to thereby provide effective areas of like dimensions upon the upper and lower surfaces of said diaphragm, said second mentioned bellows having a passage affording communication between the interior thereof and atmosphere, a third bellows located at a remote point, a conduit leading from said first mentioned bellows and affording communication between the same and said third bellows, a quantity of liquid common to and filling said first and third bellows and the conduit associated therewith in the normal positions of said bellows, a fixed support to which the conduit end of said third bellows is rigidly attached, a control element normally biased to a given extreme position and adapted for operation thereof against said bias to its opposite extreme position by the free end of said third bellows upon a given degree of expansion of the latter as an incident to upward movement of said diaphragm, and means utilizing a body of liquid the rising level of which is adapted to effect such upward movement of the diaphragm.

ALLAN P. CHARBONNEAU.